(12) United States Patent
Osuka et al.

(10) Patent No.: US 11,849,208 B2
(45) Date of Patent: Dec. 19, 2023

(54) IMAGING APPARATUS

(71) Applicant: Panasonic Intellectual Property Management Co., Ltd., Osaka (JP)

(72) Inventors: Kyosuke Osuka, Osaka (JP); Yasuhiro Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 23 days.

(21) Appl. No.: 17/555,634

(22) Filed: Dec. 20, 2021

(65) Prior Publication Data

US 2022/0210320 A1    Jun. 30, 2022

(30) Foreign Application Priority Data

Dec. 28, 2020   (JP) ................................. 2020-219324

(51) Int. Cl.
| | |
|---|---|
| *H04N 23/617* | (2023.01) |
| *H04N 23/60* | (2023.01) |
| *H04N 23/63* | (2023.01) |

(52) U.S. Cl.
CPC ......... *H04N 23/617* (2023.01); *H04N 23/631* (2023.01); *H04N 23/633* (2023.01); *H04N 23/64* (2023.01)

(58) Field of Classification Search
CPC ......... H04N 5/23225; H04N 5/232933; H04N 5/23222; H04N 5/23245; H04N 5/232939; G06F 9/44526

See application file for complete search history.

(56) References Cited

U.S. PATENT DOCUMENTS

| | | | |
|---|---|---|---|
| 5,585,878 A | 12/1996 | Matsukawa | |
| 2018/0152626 A1 | 5/2018 | Matsuoka | |
| 2020/0007787 A1 | 1/2020 | Ueno | |
| 2020/0059597 A1* | 2/2020 | Chen | ..................... H04N 23/64 |

FOREIGN PATENT DOCUMENTS

| | | |
|---|---|---|
| JP | H07-077718 A | 3/1995 |
| JP | 2003-043564 A | 2/2003 |
| JP | 2010-062714 A | 3/2010 |
| JP | 2012-189883 A | 10/2012 |
| JP | 2018-087937 A | 6/2018 |
| JP | 2020-004286 A | 1/2020 |

\* cited by examiner

*Primary Examiner* — Xi Wang
(74) *Attorney, Agent, or Firm* — Renner, Otto, Boisselle & Sklar, LLP

(57) ABSTRACT

An imaging apparatus includes: an image sensor configured to capture a subject image to generate image data; a plurality of operation members each operable to input a user operation; a selector configured to select one pattern from among a plurality of patterns each indicating a combination whether or not each operation member is to be set to a lock state for disabling the user operation; and a controller configured to control a lock function based on the pattern selected by the selector, the lock function causing the plurality of operation members to disable the user operation in an operation member which is in the lock state and to enable the user operation in another operation member which is not in the lock state.

20 Claims, 16 Drawing Sheets

| LOCK PATTERN INFORMATION | | | |
|---|---|---|---|
| TARGET MEMBER | PATTERN 1 | PATTERN 2 | PATTERN 3 |
| FRONT DIAL | LOCK | LOCK | UNLOCK |
| REAR DIAL | LOCK | LOCK | UNLOCK |
| MOVING IMAGE BUTTON (TOP) | UNLOCK | UNLOCK | UNLOCK |
| EVF BUTTON | UNLOCK | LOCK | UNLOCK |
| MOVING IMAGE BUTTON (FRONT) | UNLOCK | UNLOCK | LOCK |
| ⋮ | ⋮ | ⋮ | ⋮ |
| INTERCHANGE-ABLE LENS | UNLOCK | LOCK | UNLOCK |

Fig. 16

| MENU | SUB MENU | DETAILS | MODE 1 | MODE 2 | MODE 3 ··· |
|---|---|---|---|---|---|
| PHOTO MENU | Photo style | | Standard | V-Log | ··· |
| | ISO | — | 200 | 400 | ··· |
| | White balance | — | AWB | Kelvin(5500K) | ··· |
| | : | : | : | : | ··· |
| CUSTOM MENU | Touch setting | | OFF | ON | ··· |
| | Lock lever setting | Front dial | LOCK | LOCK | ··· |
| | | Rear dial | LOCK | LOCK | ··· |
| | | Front button | UNLOCK | LOCK | ··· |
| | | EVF button | UNLOCK | LOCK | ··· |
| | | : | : | : | ··· |
| | Photo gridline | | Tripartition | OFF | ··· |
| MOVIE MENU | : | : | : | : | ··· |
| : | : | : | : | : | ··· |

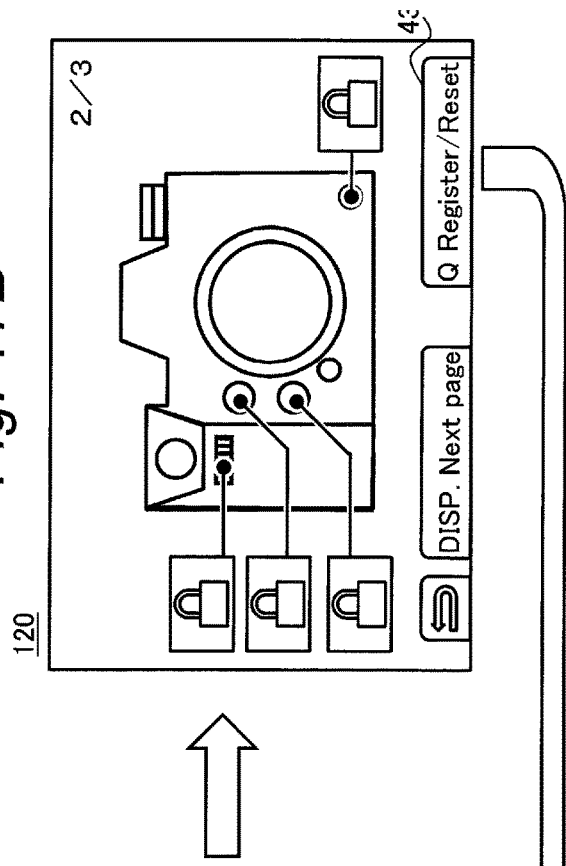
Fig. 17A
Fig. 17B
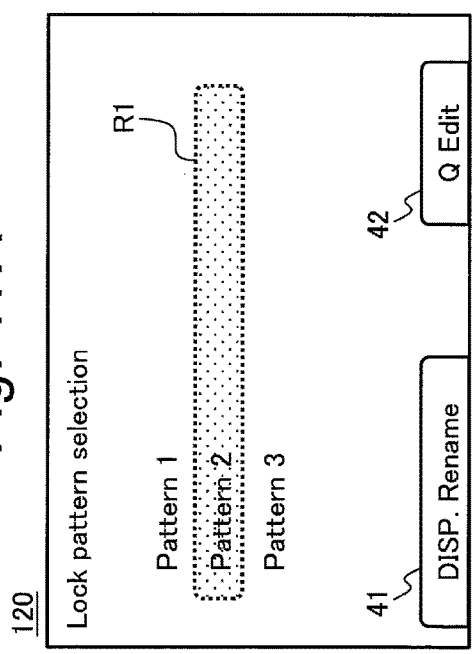
Fig. 17C
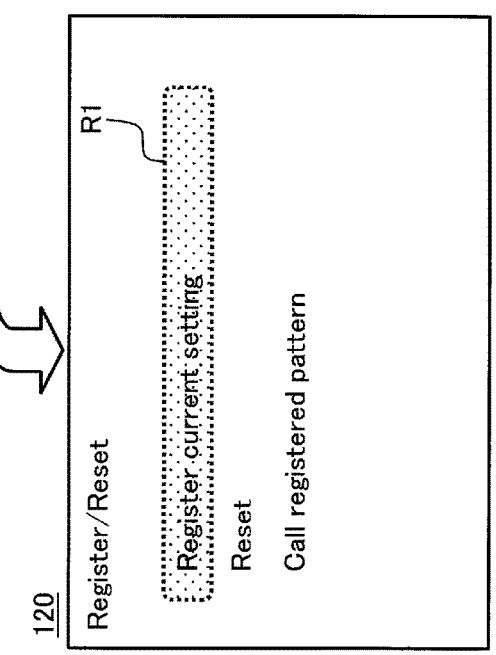
Fig. 17D

IMAGING APPARATUS

BACKGROUND

1. Technical Field

The present disclosure relates to an imaging apparatus having a function of disabling an operation by a user.

2. Related Art

JP 2012-189883 A discloses an imaging apparatus capable of setting enabling and disabling of an operation member. In this imaging apparatus, whether or not each of a plurality of operation members such as a main dial, a sub dial, and a multi-controller is a target of operation to be disabled when the operation member is set to a lock state is set. In a lock state, in response to an operation of an operation member set to be a target of operation to be disabled, a warning indicating that the operation is disabled is displayed in a display area in which information regarding a function assigned to the operated operation member is displayed.

SUMMARY

The present disclosure provides an imaging apparatus capable of facilitating to suppress erroneous operations in various situations.

In one aspect of the present disclosure, an imaging apparatus includes: an image sensor configured to capture a subject image to generate image data; a plurality of operation members each operable to input a user operation; a selector configured to select one pattern from among a plurality of patterns each indicating a combination whether or not each operation member is to be set to a lock state for disabling a user operation; and a controller configured to control a lock function based on a pattern selected by the selector, the lock function causing the plurality of operation members to disable the user operation in an operation member that is in the lock state and to enable the user operation in another operation member that is not in the lock state.

In another aspect of the present disclosure, an imaging apparatus includes: an image sensor configured to capture a subject image to generate image data; a plurality of operation members each operable to input a user operation; a controller configured to set a lock state in which a user operation is disabled in the plurality of operation members; and a display configured to display information. The controller is configured to control the display to display a plurality of position markers showing identifications of respective positions where the plurality of operation members are arranged in the imaging apparatus. Based on a user operation selecting a specific position marker from the plurality of position markers, the controller is configured to switch whether an operation member corresponding to a selected position marker is to be set to the lock state or not.

According to the imaging apparatus of the present disclosure, it is possible to facilitate to suppress an erroneous operation in various situations.

BRIEF DESCRIPTION OF THE DRAWINGS

FIG. 16 is a diagram for illustrating a modification of the lock pattern selection operation;

FIGS. 17A to 17D are diagrams for illustrating a modification of the lock pattern editing operation.

DETAILED DESCRIPTION

Hereinafter, embodiments of the present disclosure will be described with reference to the drawings as appropriate. However, in the detailed description, unnecessary portions of the description related to the prior art and substantially the same configuration may be omitted. This is to simplify the description. In addition, the following description and the accompanying drawings are disclosed to enable those skilled in the art to fully understand the present disclosure, and are not intended to limit the subject matter of the claims.

First Embodiment

Hereinafter, the configuration and operation of a digital camera being an embodiment of an imaging apparatus according to the present disclosure will be described.

1. Configuration

Figure 1:
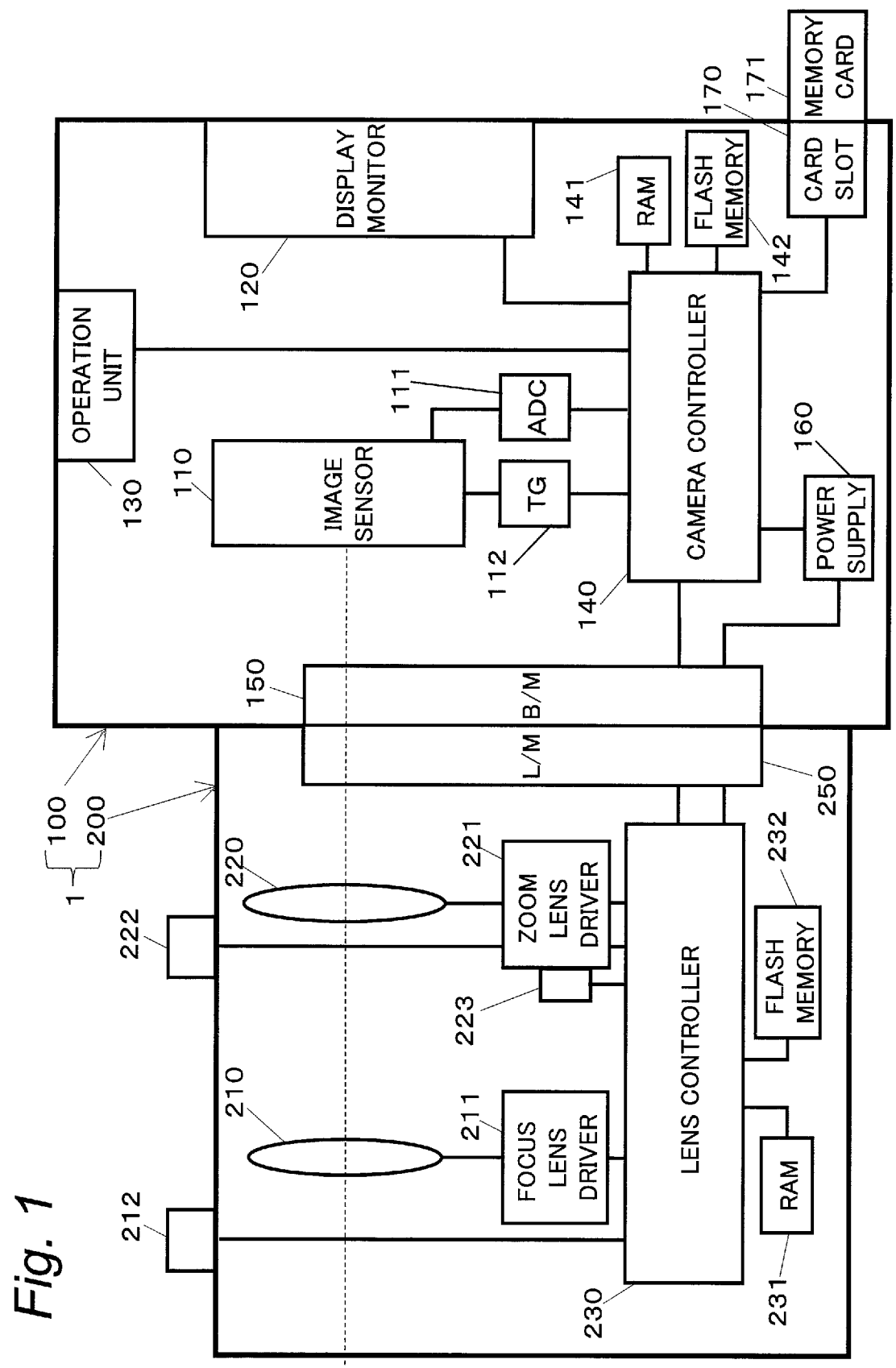
FIG. 1 is a block diagram showing a configuration of a digital camera according to a first embodiment of the present disclosure.

FIG. 1 is a block diagram showing the configuration of a digital camera 1 according to the first embodiment. The digital camera 1 of the present embodiment includes a camera main body 100 and an interchangeable lens 200 attachable thereto and detachable therefrom.

1-1. Camera Body

The camera body 100 (an example of an imaging apparatus) includes an image sensor 110, a display monitor 120, an operation unit 130, a camera controller 140, a RAM 141, a flash memory 142, a body mount 150, a power supply 160, and a card slot 170.

The image sensor 110 is an element that captures a subject image incident through the interchangeable lens 200 to generate image data. The image sensor 110 is a CMOS image sensor, for example. The generated image data is digitized by an AD converter 111. Predetermined image processing is performed on the digitized image data by the camera controller 140. The predetermined image processing includes gamma correction processing, white balance correction processing, flaw correction processing, YC conversion processing, electronic zoom processing, and JPEG compression processing, for example. The image sensor 110 may be a CCD image sensor, an NMOS image sensor, or the like.

The image sensor 110 operates at the timing controlled by the timing generator 112. The image sensor 110 generates a still image or a moving image for recording, or a through image. The through image is mainly a moving image, and is displayed on the display monitor 120 in order for the user to determine composition for capturing a still image.

The display monitor 120 is an example of a display that displays an image such as a through image and various information such as a menu screen. For example, the display monitor 120 includes various display devices such as a liquid crystal display device or an organic EL device. In addition to or instead of the display monitor 120, the digital camera 1 may include, for example, an electronic viewfinder (EVF) or the like being an example of another display in the camera body 100.

The operation unit 130 is a generic term for a user interface that receives an operation (instruction) from the user. When receiving a user operation, the operation unit 130 transmits an operation signal indicating various instructions according to the user operation to the camera controller 140. For example, the operation unit 130 includes physical buttons, levers, dials, touch panels, switches, and the like. The operation unit 130 may also include virtual buttons and icons displayed on the display monitor 120. A specific example of the operation unit 130 will be described below.

The camera controller 140 controls the operation of the entire digital camera 1 by controlling components such as the image sensor 110 according to instructions from the operation unit 130. The camera controller 140 transmits a vertical synchronization signal to the timing generator 112. In parallel with this, the camera controller 140 generates a synchronization signal synchronized with the vertical synchronization signal, and transmits the synchronization signal to the lens controller 230 via the body mount 150 and the lens mount 250. The camera controller 140 uses a RAM 141 as a work memory during control operations and image processing operations.

The flash memory 142 stores programs and parameters used when the camera controller 140 performs control.

The body mount 150 is mechanically and electrically connectable to the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 230 via the lens mount 250.

The body mount 150 transmits other control signals received from the camera controller 140 to the lens controller 230 via the lens mount 250. The body mount 150 transmits the signal received from the lens controller 230 to the camera controller 140 via the lens mount 250. The body mount 150 supplies the power from the power supply 160 to whole of the interchangeable lens 200 via the lens mount 250.

The power supply 160 is a circuit that supplies power to each element in the digital camera 1.

The card slot 170 is capable of mounting a memory card 171, and controls the memory card 171 based on control from the camera controller 140. The digital camera 1 can store image data into the memory card 171 and can read image data from the memory card 171.

1-2. Interchangeable Lens

As shown in FIG. 1, the interchangeable lens 200 includes a focus lens 210, a focus lens driver 211, a focus ring 212, a zoom lens 220, a zoom lens driver 221, a zoom ring 222, a lens controller 230, a RAM 231, a flash memory 232, and a lens mount 250. The interchangeable lens 200 may further include an image stabilizer lens in addition to the lens shown in FIG. 1.

Each of the focus ring 212 and the zoom ring 222 is an example of an operation member provided in the interchangeable lens 200. The operation member of the interchangeable lens 200 is not limited thereto, and may include, for example, a button or the like provided on the exterior.

The lens controller 230 controls the operation of the entire interchangeable lens 200. The lens controller 230 may include a hard-wired electronic circuit, or a microcomputer and the like that executes a program.

The RAM 231 functions as a work memory used when the lens controller 230 performs control. The flash memory 232 stores programs, parameters, lens data, and the like used for the control by the lens controller 230.

The zoom lens 220 is a lens for changing magnification of a subject image formed by the optical system of the interchangeable lens 200. The lens configuration of the zoom lens 220 may be any number of lenses or any number of groups.

The zoom lens driver 221 is a mechanical mechanism that moves the zoom lens 220 along the optical axis of the optical system based on the operation of the zoom ring 222 by the user. The position of the zoom lens 220 is detected by the zoom lens position detector 223 as needed, and is notified to the lens controller 230.

The focus lens 210 is a lens for changing a focus state of a subject image incident from the optical system and formed on the image sensor 110. The lens configuration of the focus lens 210 may be any number of lenses or any number of groups.

The focus ring 212 is provided on the exterior of the interchangeable lens 200. When the focus ring 212 is operated by the user, information on the operation amount of the focus ring 212 is notified to the lens controller 230. The lens controller 230 controls the focus lens driver 211 based on the notified information on the operation amount of the focus ring 212 to drive the focus lens 210. Therefore, the lens controller 230 recognizes the position of the focus lens 210.

The focus lens driver 211 drives the focus lens 210 to move back and forth along the optical axis of the optical system based on the control of the lens controller 230. For example, the focus lens driver 211 can be implemented by a stepping motor, a DC motor, an ultrasonic motor, or the like.

1-3. Operation Unit

Figure 2:
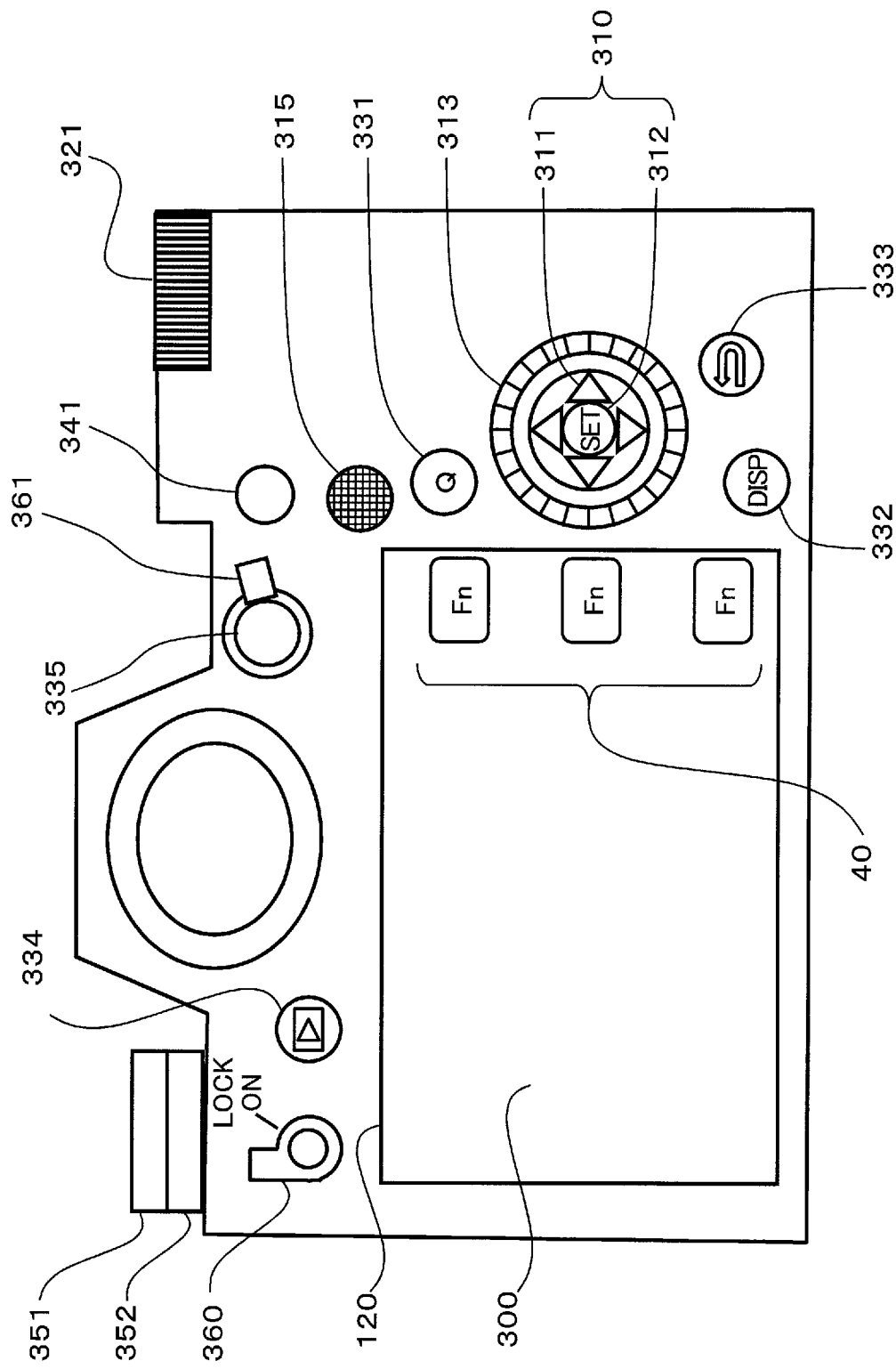
FIG. 2 is a rear view of the digital camera.
Figure 3:
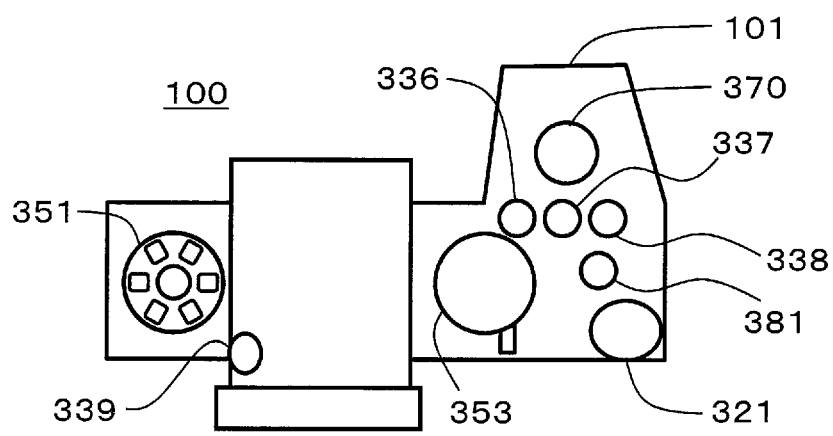
FIG. 3 is a top view of a camera body in the digital camera.
Figure 4:
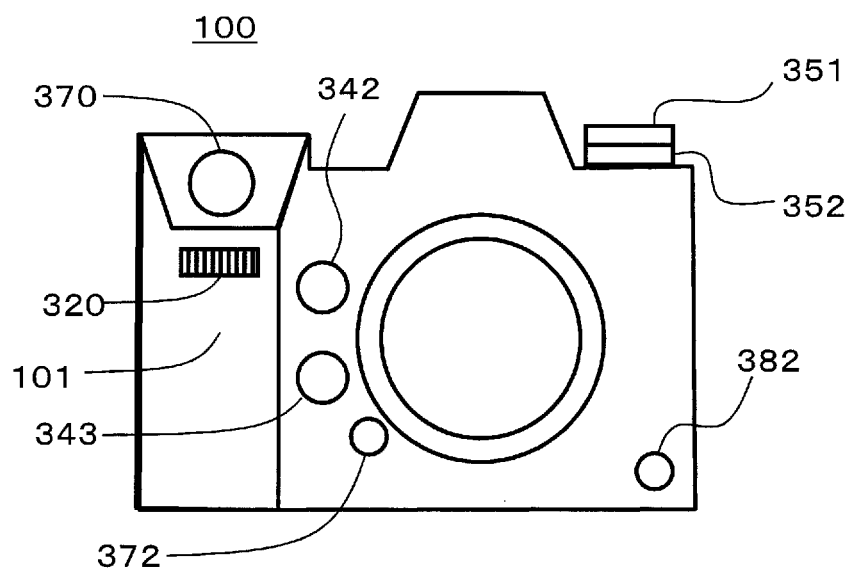
FIG. 4 is a front view of the camera body in the digital camera.

A specific example of the operation unit 130 in the camera body 100 of the digital camera 1 will be described with reference to FIGS. 2 to 4. FIG. 2 is a diagram showing the back surface of the digital camera 100. FIG. 3 is a top view in which the camera body 100 is viewed from above. FIG. 4 shows a front view of the camera body 100.

FIG. 2 illustrates the touch panel 300 and various operation members provided therearound as an example of the operation unit 130 of the camera body 100. For example, the operation members provided on the right side in FIG. 2 in the camera body 100 includes a selection key 310, a control wheel 313, a joystick 315, a rear dial 321, a Q button 331, a DISP button 332, a return button 333, and an Fn button 341. Furthermore, on the upper side in FIG. 2, a reproduction button 334, an AF mode button 335, a shooting mode dial 351, a drive mode dial 352, a focus lever 361, and a lock lever 360 are provided.

As shown in FIG. 3, the camera body 100 includes a grip 101 being a structure for the user to grip with the right hand during shooting or the like. Each of the various operation members on the right side in FIG. 2 described above is an example of the operation member around the grip 101. Furthermore, as shown in FIG. 3, a shutter button 370, a WB button 336, an ISO button 337, an exposure correction button 338, a moving image button 381, and a mode dial 353 are provided around the grip 101. The operation member around the grip 101 further includes a front dial 320 as shown in FIG. 4.

Furthermore, as shown in FIGS. 3 and 4, an EVF button 339, an Fn button 342,343, a moving image button 382, and a lens detachment button 372 are provided at positions away from the grip 101. The digital camera 1 is further provided with a power button (not shown) for turning on/off the power supply 160.

The shutter button 370 is a two-stage depression button. When the shutter button 370 is half-pressed by the user, the camera controller 140 executes autofocus control (AF control), auto exposure control (AE control), and the like. In addition, when the shutter button 370 is fully pressed by the user, the camera controller 140 records image data captured at the timing of the depressing operation in the memory card 172 or the like as a recorded image of a still image.

The selection key 310 includes depression type direction buttons 311 provided in the up, down, left, and right directions and a depression type SET button 312 provided at the center. The user can move a region or the like for selecting various condition items to be displayed on the display monitor 120 by depressing any one of the up, down, left, and right direction buttons 311. When the user depresses the SET button 312 while the digital camera 1 is in the shooting mode or the reproduction mode, the camera controller 140 displays a menu screen on the display monitor 120. The menu screen is a screen for setting various conditions for shooting/reproduction. In response to depressing the SET button 312 with a setting item for various conditions being selected, the camera controller 140 determines the setting of the selected item.

The control wheel 313 is an operation member provided around the selection key 310 and rotatable. The joystick 315 is an operation member that realizes a function similar to that of the direction button 311 in the selection key 310 by an operation of inclining its direction, and that realizes a function similar to that of the SET button 312 by an operation of pressing the joystick 315.

Various functions of the digital camera 1 are assigned to each of the various depression buttons 331 to 339, 341 to 343, and 381 to 382. For example, the reproduction button 334 has a function for shifting to the reproduction mode. To each of the Fn buttons 341 to 343, the user can assign a desired function by menu setting or the like. The Fn buttons are examples of physical function buttons. For example, a function of turning on the AF mode can be assigned to the Fn button 341. Both of the moving image buttons 381 and 382 have a function for starting/ending shooting recording of a moving image.

The touch panel 300 is arranged so as to superimpose with the display screen of the display monitor 120, and detects a touch operation on the display screen by the user's finger. Thus, the user can perform operations such as designation of a region on the image displayed on the display monitor 120, various selections on the menu screen and the like.

For example, virtual Fn buttons 40 are displayed on the display monitor 120. Similarly to the physical Fn buttons 341 to 343, various functions can be independently assigned to the respective virtual Fn buttons 40. The virtual Fn button 40 can be operated by a touch operation on the touch panel 300, for example.

The various mode dials 351 to 353 are stepwise rotary operation members, and can be used to set various modes in the digital camera 100. The front/rear dials 320 and 321 are continuous rotary operation members, and can be used for various parameter adjustments.

The various levers 360 and 361 are operation members having physical positions indicating an operated state in stages. The lock lever 360 is an example of a lock member that is an operation member to switch between an ON state in which an operational lock function described below is active and an OFF state in which the operational lock function is inactive. The lock member is not limited to the lever type, and may include a depression type button, for example.

2. Operation

The operation of the digital camera 1 configured as described above will be described in the following.

An outline of an operation related to the operational lock function of the digital camera 1 in the present embodiment will be described. The digital camera 1 of the present embodiment has an operational lock function being a function of controlling a lock state in which a user operation is disabled in various operation members such as the operation unit 130.

In the digital camera 1, an operation member to be in a lock state for the operational lock function is set in advance. When the lock lever 360 is turned on, the digital camera 1 enables the operational lock function to control the lock state. For the operational lock function, it is conceivable that an operation member likely to cause an erroneous operation is different according to various image-shooting situations. Thus, various needs are conceivable to which operation member the user desires to set to the lock state.

For example, a case for shooting a still image can be considered that the user desires to lock just the operation members around the grip 101 of the digital camera 1 other than shutter button 370. For example, when the user repeats moving and shooting with the grip 101 being held by one hand, an erroneous operation of unintentionally pressing an operation member around the grip 101 is anticipated.

In addition, for shooting a moving image with the digital camera 1, a case can also be considered that the user desires to lock not only the operation members around the grip 101 but also all the operation members other than the moving image buttons 381 and 382. For example, when a director in a team that shoots the moving image causes an assistant to perform an operation to start shooting in a state that a desired moving-image image quality or the like has been set on the digital camera 1, it would be desired to prevent the assistant from erroneously operating to change the image quality by mistake.

Furthermore, when various equipment are used for shooting with the digital camera 1, it is also conceivable that the user desires to lock an operation member disposed at a specific position according to attachment positions of the various equipment. For example, when the digital camera 1 is mounted on a drone, a gimbal, or the like, or mounts a camera rig or other equipment, it is likely to cause an erroneous operation due to contact near a place where the digital camera 1 is held by various equipment.

In order to meet various needs over such various shooting situations, the present embodiment expands the number of operation members settable to the lock state in the operational lock function, and the digital camera 1 is provided with a pattern, that is, a lock pattern for setting whether or not to individually set each operation member to the lock state. Hereinafter, details of the operation of the digital camera 1 according to the present embodiment will be described.

2-1. Lock Pattern of Operational Lock Function

The operational lock function and the lock pattern in the digital camera 1 of the present embodiment will be described with reference to FIG. 5.

Figure 5:
FIG. 5 is a diagram for illustrating lock pattern information in the first embodiment.

FIG. 5 is a diagram for illustrating the lock pattern information D1 according to the present embodiment. The lock pattern information D1 is information for managing one or more lock patterns in the digital camera 1, and is stored in the flash memory 142 of the camera body 100, for example.

The lock pattern information D1 illustrated in FIG. 5 manages a state in which an individual target member is set to "lock" or "unlock" in each lock pattern, for example. The target member is an individual operation member to be set in the operational lock function. The "lock" indicates a setting state being a lock target, that is, a target set to the lock state when the operational lock function is active. The "unlock" indicates a setting state of being an unlock target, that is, a target not set to the lock state even when the operational lock function is active.

In the operational lock function of the present embodiment, each of the various physical operation members in the operation unit 130 of the digital camera 1 is basically a separate target member. For example, the touch panel 300 is one target member. The plurality of moving image buttons 381 and 382 have the same function but are different target members. Each of the plurality of physical Fn buttons 341 to 343 is also a separate target member.

It should be noted that although the selection key 310 includes the direction buttons 311 in various directions and the SET button 312, these buttons are not separated individually and constitute one target member. On the other hand, the control wheel 313 is a target member different from the selection key 310. As with the selection key 310, the joystick 315 includes a plurality of operation means but constitutes one target member. The virtual Fn buttons 40 do not particularly constitute a separate target member. For example, the touch operation on each Fn button 40 can be collectively disabled by the lock state of the touch panel 300.

For example, in the lock pattern information D1 illustrated in FIG. 5, as the use for still image shooting, the pattern 1 sets the operation member around the grip 101 to the lock target and sets the others to the unlock target. As the use for moving image shooting, the pattern 2 sets all the operation members other than the moving image buttons 381 and 382 to lock targets. As the use for shooting using specific equipment (e.g., a drone), the pattern 3 sets only a specific operation member such as the moving image button 382 on the front surface side of the digital camera 1 to the lock target.

In the present embodiment, since the operational lock function has a large number of target members, a situation is presumed where the user is hard to check the setting of a desired target member. Thus, the digital camera 1 of the present embodiment provides a user interface that makes it easy for the user to find a desired target member from the large number of target members and to check the setting of the lock/unlock target (see FIGS. 9 to 11).

In the present embodiment, the target member having the operational lock function may include an external apparatus. In the digital camera 1 of the example in FIG. 5, the interchangeable lens 200 is managed as a target member. Thus, an erroneous operation of the interchangeable lens 200, being an external apparatus of the camera body 100, can also be suppressed. In the present embodiment, as with the lock pattern information D1, setting information of the interchangeable lens 200 related to the operational lock function is stored in the flash memory 142 or the like on the camera body 100 side, for example.

Thus, for example, when the interchangeable lens 200 is replaced from the first camera body 100 to the second camera body 100, the interchangeable lens 200 can be used in the second camera body 100 without remaining the setting of the operational lock function in the first camera body in the interchangeable lens 200. Therefore, even if the interchangeable lens 200 is set to a lock target in the first camera body, it is possible to suppress a situation in which using the interchangeable lens in the second camera body thereafter causes the interchangeable lens 200 to be unintentionally set to a lock state. Thus, it is possible to make the operational lock function related to the external apparatus easy to use.

In the operational lock function of the present embodiment, the entire interchangeable lens 200 is handled as one target member, rather than separately handling operation members such as the various rings 212 and 222 in the interchangeable lens 200 that is an external apparatus. Thus, settings of various interchangeable lenses 200 can be collectively managed in the camera body 100, for example. Therefore, the operational lock function as described above can be easily achieved.

In the present embodiment, some operation members in the digital camera 1 may be excluded from the target of the operational lock function. For example, an operation member physically indicating the operation state may be out of the target of the operational lock function. For example, the operation member being not the target member of the operational lock function may be the lock lever 360, the focus lever 361, the lens detachment button 372, various mode dials 351 to 353, a power switch, and the like. In addition, the shutter button 370 may not be a target member of the operational lock function, or may be a target member.

2-2. Lock Pattern Selection Operation

An exemplary operation of the digital camera 1 for selecting a lock pattern to be applied to the operational lock function from the above-described various lock patterns will be described with reference to FIGS. 6 to 7B. In the following, an operation example using the setting menu of the digital camera 1 will be described.

Figure 6:
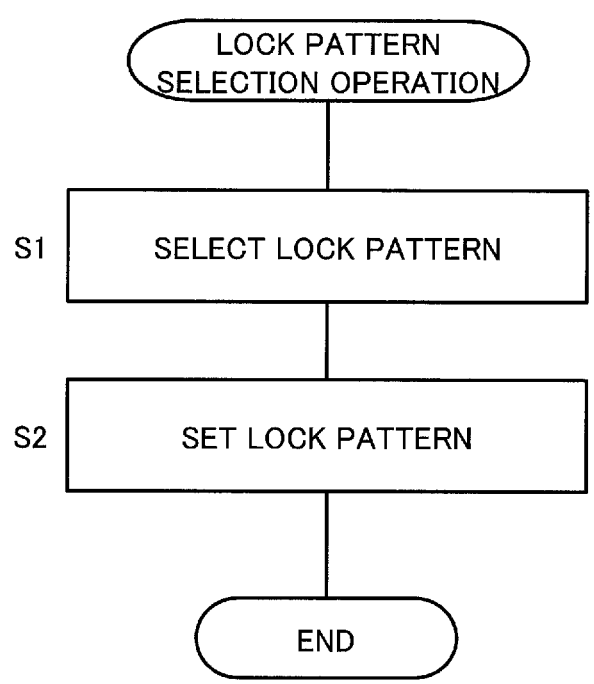
FIG. 6 is a flowchart for illustrating a lock pattern selection operation in the digital camera.
Figure 7A:
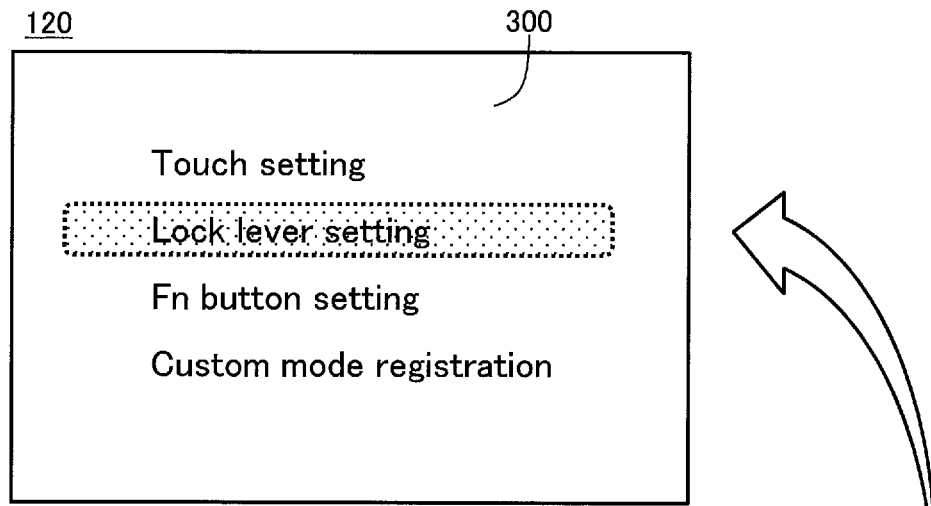
FIGS. 7A and 7B are diagrams showing display examples of the lock pattern selection operation in the first embodiment.

FIG. 6 is a flowchart for illustrating a lock pattern selection operation in the digital camera 1. FIGS. 7A and 7B are diagrams showing a display example of the lock pattern selecting operation in the present embodiment.

For example, the processing of the flowchart shown in FIG. 6 is started when a user operation of selecting a menu item "lock lever setting" on the menu screen illustrated in FIG. 7A is input. The processing of the present flow is executed by the camera controller 140 in a state where the lock pattern information D1 is stored in the digital camera 1, for example.

At first, the camera controller 140 acquires a lock pattern of a selection result in response to an input of a user operation of selecting a lock pattern (S1). For example, the camera controller 140 causes the display monitor 120 to transition to the pattern selection screen illustrated in FIGS. 7A to 7B, and enables various user operations related to the pattern selection screen via the various operation units 130. The pattern selection screen is a setting screen for selecting one lock pattern with a plurality of preset lock patterns as options.

Figure 7B:
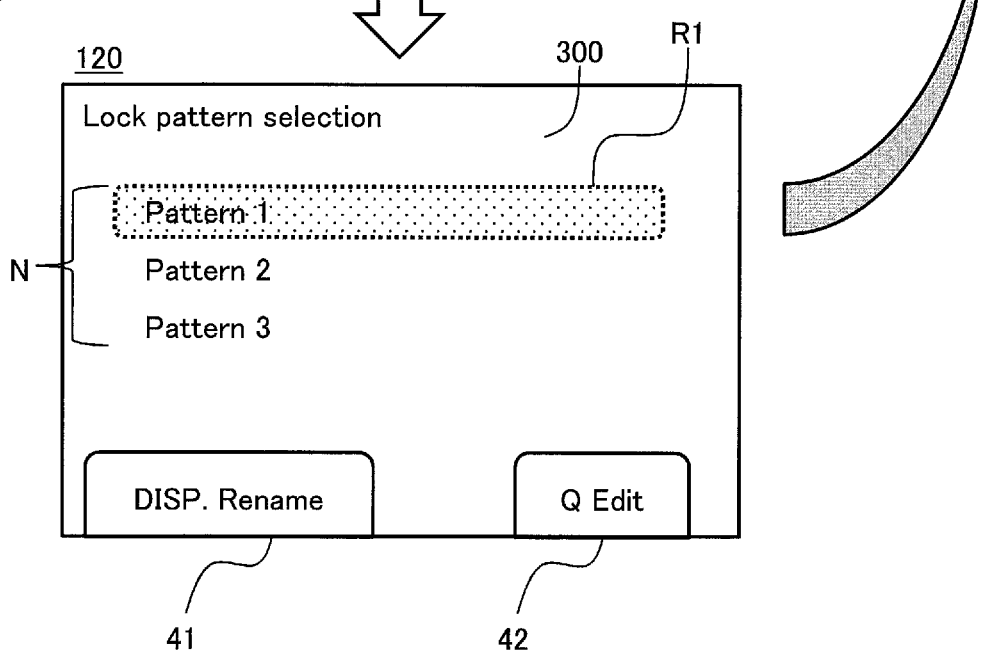

The pattern selection screen illustrated in FIG. 7B includes a plurality of lock pattern options N (N=1 to 3) such as "pattern 1" to "pattern 3", a rename button 41, and an edit button 42. The rename button 41 is to receive a user operation for changing a name such as "pattern 1". The edit button 42 is to receive a user operation for changing the content of the lock pattern in each option N.

For example, the user can move the focus region R1 illustrated in FIG. 7B between the plurality of option patterns N by the operation of the selection key 310 or the joystick 315 or by the touch operation on the touch panel 300. The focus region R1 is a region where an operation target such as determination is highlighted on the menu screen.

When the user operates the SET button 312 of the selection key 310 or the like with the focus region R1 being arranged on the desired option N in order to decide the desired option N, the camera controller 140 acquires a lock pattern corresponding to the focus region R1 as a selection result from the lock pattern information D1 stored in advance in the flash memory 142, for example (S1). The various operation units 130 used in step S1 are an example of a selector of the present embodiment.

Next, the camera controller 140 sets the selected lock pattern to the digital camera 1 so that the selected lock pattern is applied at the time when the operational lock function is active (S2). For example, the camera controller 140 stores information indicating the selected lock pattern in the setting information related to the lock lever 360 in the flash memory 142.

After setting the selected lock pattern (S2), the camera controller 140 returns, for example, the screen display of the display monitor 120 from FIG. 7B to FIG. 7A, and ends the processing of the present flow.

According to the lock pattern selecting operation described above, the user can select a desired lock pattern from a plurality of lock pattern options N in the setting menu, for example (S1). Thus, the operational lock function can be easily used according to various shooting situations.

2-2-1. Detailed Setting of Lock Pattern

The digital camera 1 of the present embodiment is able to change (i.e., edit) the setting of the lock pattern of the operational lock function for each target member by the user's operation. An example will be described where processing in the above-described step S1 is executed by the camera controller 140 when the operation of the edit button 42 in the example in FIG. 7B is input, with reference to FIGS. 8 to 11.

Figure 8:
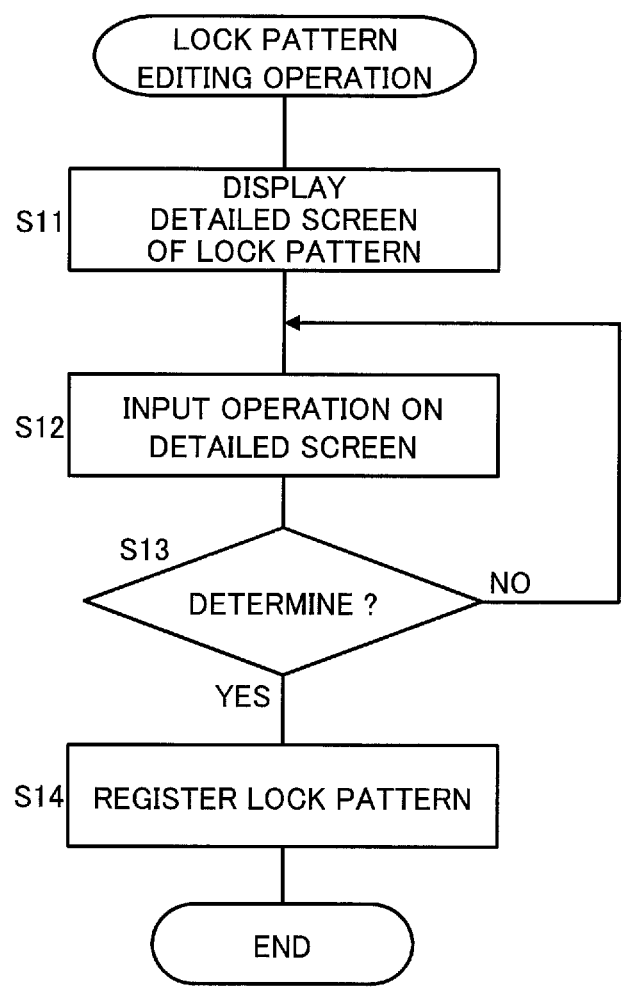
FIG. 8 is a flowchart for illustrating a lock pattern editing operation in the first embodiment.
Figure 9:
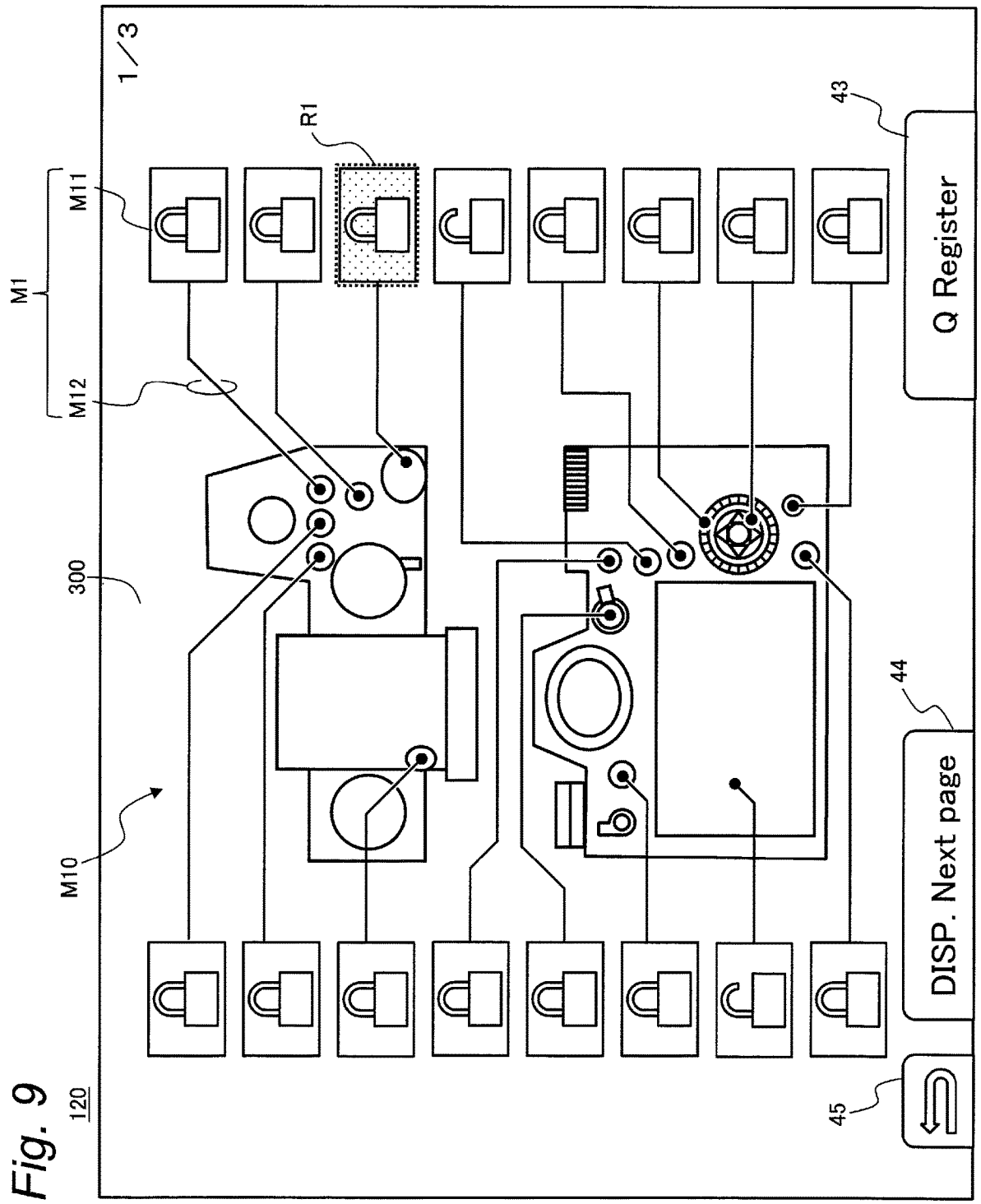
FIG. 9 is a diagram showing a first display example of a detailed screen of a lock pattern.
Figure 10:
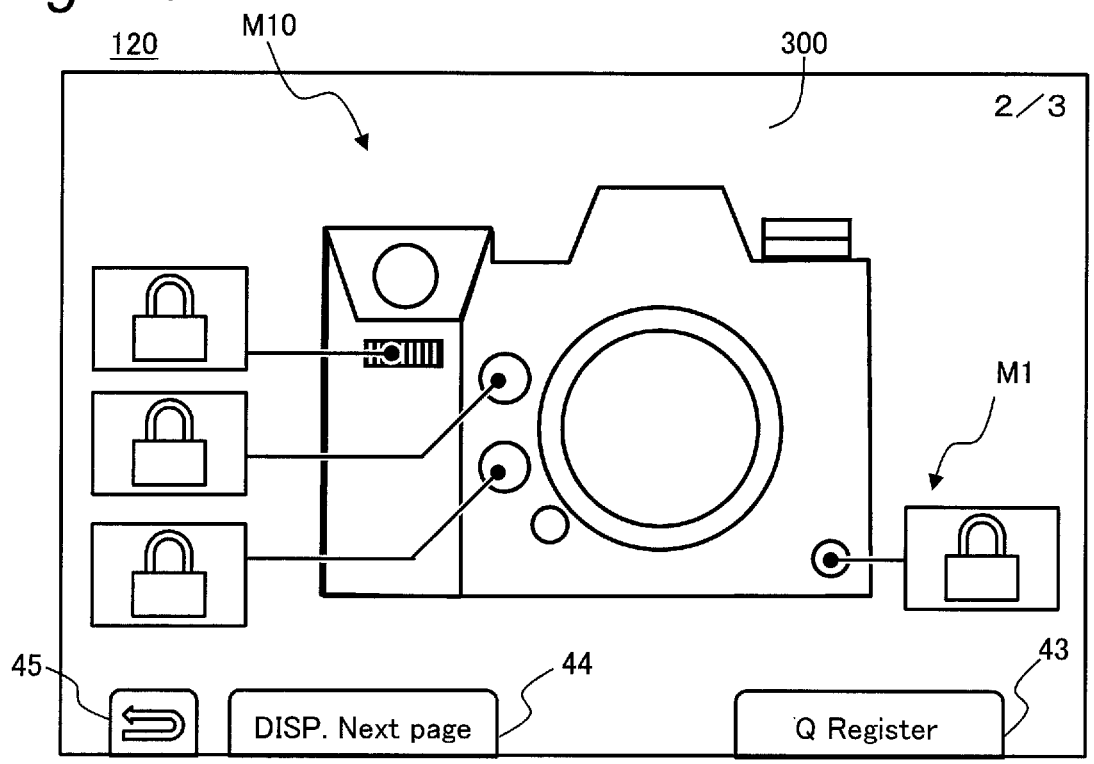
FIG. 10 is a diagram showing a second display example of the detailed screen of the lock pattern.
Figure 11:
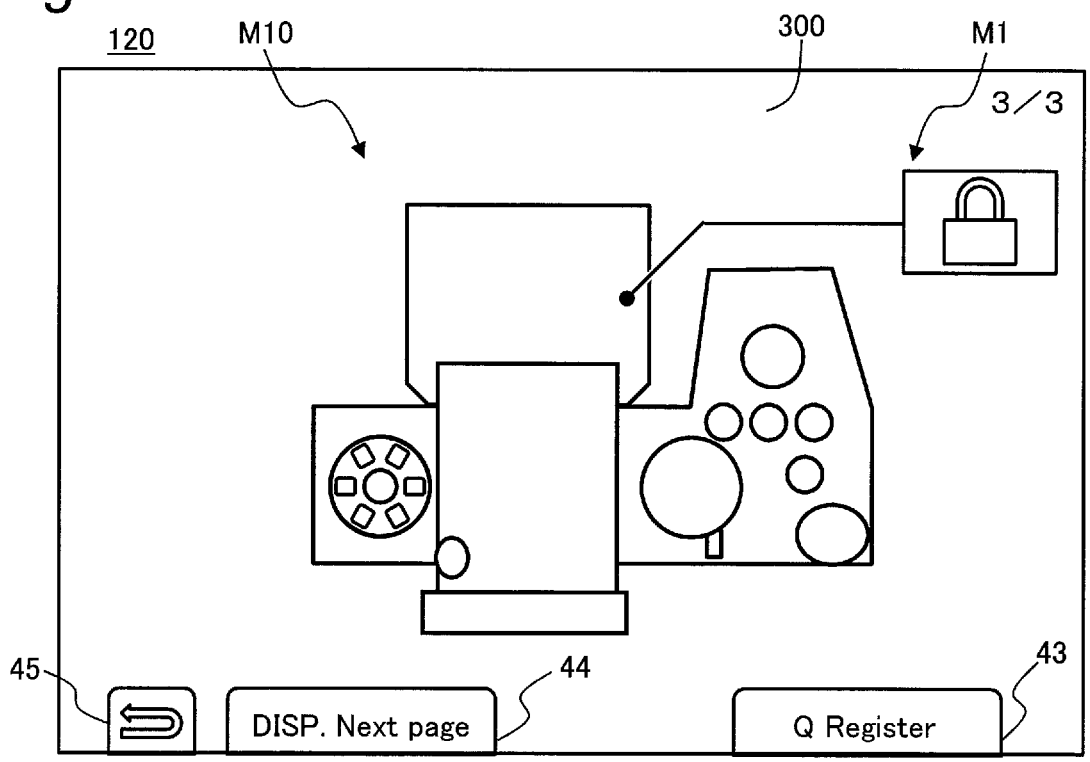
FIG. 11 is a diagram showing a third display example of the detailed screen of the lock pattern.

FIG. 8 is a flowchart for illustrating a lock pattern editing operation in the present embodiment. FIGS. 9 to 11 show first to third display examples of the detailed screen of the lock pattern.

At first, the camera controller 140 causes the display monitor 120 to display a detailed screen of the lock pattern (S11). The detailed screen of the lock pattern is, for example, a setting screen for checking or changing the setting of each target member in the lock pattern being edited. A display example of step S11 is illustrated in FIG. 9.

As illustrated in FIG. 9, the detailed screen of the lock pattern includes a plurality of lock target markers M1 indicating a state whether or not each target member is a lock target, a camera view M10 indicating an appearance of the digital camera 1, a registration button 43, and the like. According to the display screen in step S11, the user can easily check that the setting of the target member in each place in the digital camera 1 is the lock target or unlock target by the lock target marker M1 arranged in association with the camera view M10. Details of the display screen in step S11 will be described below.

The camera controller 140 receives input of various user operations related to the display screen as shown in FIG. 9 via the various operation units 130, for example (S12). The camera controller 140 determines whether the input user operation is a determination operation (S13). For example, the determination operation is a touch operation of the registration button 43 or a depression operation of the Q button 331.

For example, when the user inputs an operation of changing the state of the lock target marker M1, the camera controller 140 determines that the operation is not a determination operation (NO in S13), to update the screen display of the display monitor 120 according to the input operation, and return to step S12. For example, in order to complete the editing of the lock pattern, the user can input the determination operation as described above in a state where each lock target marker M1 is displayed with a desired setting. It should be noted that when a user operation for cancellation, e.g. a touch operation of the back button 45, is input, the camera controller 140 ends the processing of this flow by causing the screen display of the display monitor 120 to transition to a screen of a higher hierarchy.

When the determination operation is input (YES in S13), based on the state of the lock target marker M1, the camera controller 140 registers the lock pattern of the editing result in the flash memory 142 or the like (S14). For example, the camera controller 140 updates the pattern selected in step S11 in the lock pattern information D1 stored in the flash memory 142 to the lock pattern of the editing result.

After the registration of the lock pattern (S14), the camera controller 140 ends the processing shown in this flowchart by returning the screen display of the display monitor 120 to the higher menu screen such as the pattern selection screen, for example.

According to the above processing, on the detailed screen of the lock pattern (S11), the user can set the lock/unlock target for each target member of the operational lock function (S12), so as to obtain a desired lock pattern. Details of the display screen in step S11 will be described with reference to FIGS. 9 to 11.

As shown in FIGS. 9 to 11, the detailed screen of the lock pattern includes a camera view M10, a plurality of lock target markers M1, a registration button 43, a next page button 44, and a back button 45.

The camera view M10 is a view showing an external appearance such as a rear view, a top view, or a front view of the digital camera 1 or the camera body 100, for example, and includes positions of various target members in the operational lock function. The camera view M10 may be a schematic diagram such as a line based diagram, or may be an image such as a captured image.

Each of the plurality of lock target markers M1 is provided in association with the target member of the operational lock function. The lock target marker M1 is an example of a position marker displayed so as to identify the position of the corresponding operation member in the camera view M10. The lock target marker M1 includes a lock icon M11 and a lead line M12.

The lock icon M11 indicates a state in which the corresponding target member is set to either the lock target or the unlock target. The lock icon M11 is to receive a user operation for switching a lock target or an unlock target when the focus region R1 is arranged on the lock icon, for example. For example, the lock icon M11 on which the focus region R1 is arranged in the example in FIG. 9 indicates a state in which the rear dial 321 (see FIG. 2) being a corresponding target member is set to the lock target (see FIG. 3). On the other hand, a lock icon M11 arranged thereunder indicates a state in which the joystick 315 is set to the unlock target.

In the camera view M10, the lead line M12 is provided to connect the position of the target member corresponding to each lock target marker M1 and the lock icon M11. The lead line M12 is displayed not only when but also before the focus region R1 is set, for example. Thus, it allows the user to facilitate to check and change the setting of the desired target member with the lock target marker M1, by following the lead line M12 extending from the position of the desired target member in the camera view M10 to visually recognize the specific lock icon M11, for example.

In the digital camera 1 of the present embodiment, as the operational lock function has a large number of target members, there may be a plurality of pages of the detailed screen of the lock pattern. On the screen in FIG. 10, the camera view M10 for the front surface of the camera body 100 displays the lock target marker M1 of the target member on the front surface. On the screen in FIG. 11, a lock target marker M1 handling the interchangeable lens 200 being the external apparatus of the camera body 100 as a target member is displayed. The user can set the operational lock function on a desired target member with the lock target marker M1 on each screen.

When the user operates the selection key 310 (or the joystick 315) in the vertical direction in a state where the detailed screen of the lock pattern as described above is displayed (S11), the camera controller 140 moves the focus region R1 among the lock icons M11 (S12 to S13). This movement of the focus region R1 can also be performed by a touch operation of the lock icon M11. Furthermore, the lock icon M11 to which the focus region R1 is set is toggled to the lock target or the unlock target by the camera controller 140 according to the operation of the SET button 312 or the like or the touch operation.

According to the touch operation of the next page button 44 or the operation of the DISP button 332, the camera controller 140 causes the detailed screen of the lock pattern displayed on the display monitor 120 to transition to the next page. According to the touch operation of the back button 45 or the operation of the return button 333, the screen display of the display monitor transitions to a menu screen one level higher.

In addition, the digital camera 1 may be provided with a lock pattern as an initial value. For example, the initial value lock pattern sets specific target members such as the selection key 310, the joystick 315, the touch panel 300, the various dials 320 to 321, and the DISP button 332 to the lock targets, and the other target members to the unlock targets. For example, in a menu operation, a predetermined user operation for resetting the lock pattern to an initial value may be provided, and for example, a virtual button for receiving a reset operation may be provided on a detailed screen of the lock pattern.

2-3. Activation of Operational Lock Function

An operation of the digital camera 1 when the operational lock function is activated with the lock pattern set as described above will be described below.

2-3-1. Switching Processing of Operational Lock Function

The processing for switching between inactive and active of the operational lock function will be described with reference to FIGS. 12 and 13.

Figure 12:
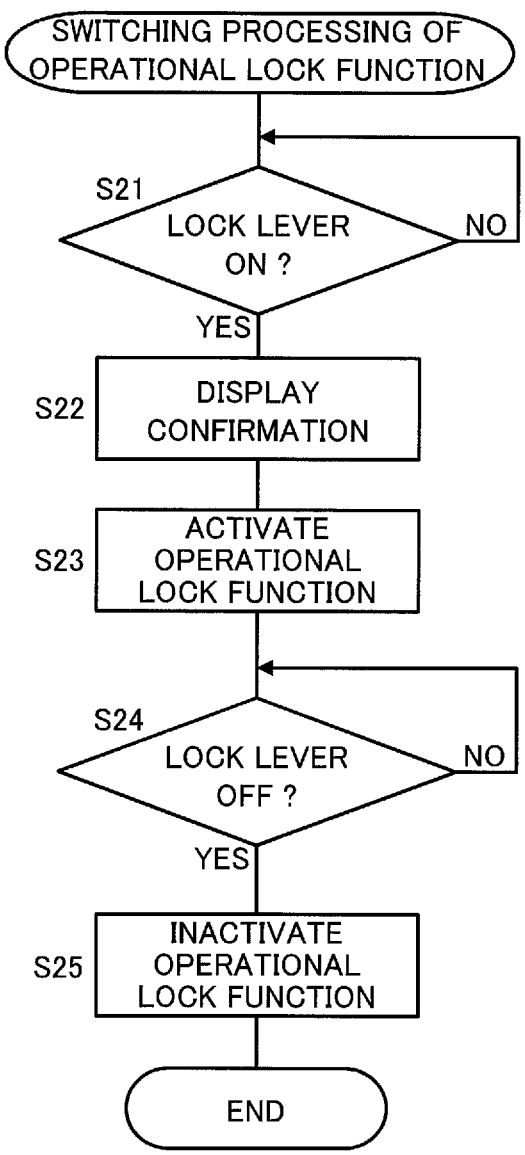
FIG. 12 is a flowchart for illustrating switching processing of an operational lock function in the digital camera.

FIG. 12 is a flowchart for illustrating switching processing of the operational lock function in the digital camera 1. FIG. 13 shows a display example in the switching processing of the operational lock function. The processing shown in the present flow is started with the lock lever 360 being in OFF state where the operational lock function is inactive, and is executed by the camera controller 140, for example.

At first, the camera controller 140 determines whether or not the lock lever 360 is changed to the ON state based on the operation signal from the lock lever 360 (S21). When the lock lever 360 is in the OFF state (NO in S21), the camera controller 140 repeats the determination in step S21 at a predetermined cycle, for example. At this time, in response to input of an operation signal from various operation members by various user operations, the camera controller 140 executes control according to an instruction indicated by the operation signal. As described above, when the operational lock function is inactive, various user operations are enabled.

When the lock lever 360 is changed to the ON state (YES in S21), the camera controller 140 causes the display monitor 120 to display a confirmation screen regarding the activation of the operational lock function, for example (S22). A display example in step S23 is shown in FIG. 13.

Figure 13:
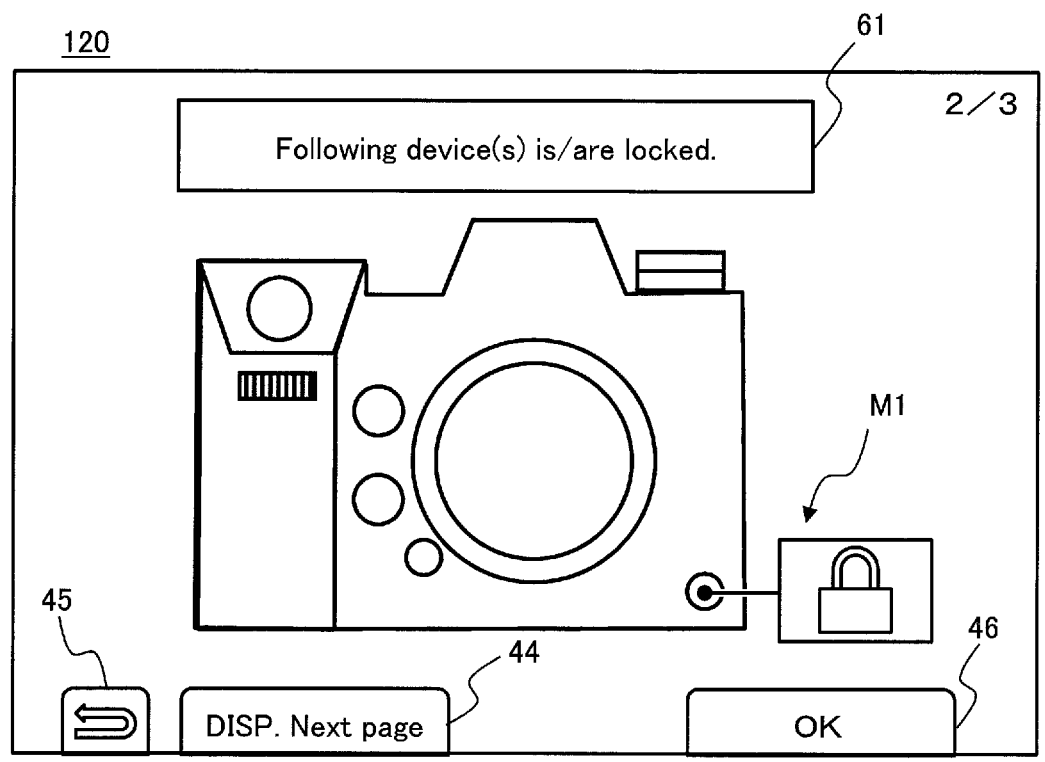
FIG. 13 is a diagram showing a display example in the switching processing of the operational lock function.

The confirmation screen illustrated in FIG. 13 includes a lock target marker M1 for a target member of a lock target in the set lock pattern, and a message 61 such as "Following device(s) is/are locked". For example, the camera controller 140 causes the display monitor 120 to display the confirmation screen during a predetermined duration from the time of changing the lock lever 360 to the ON state, or until the OK button 46 is operated (S22). Thereafter, the screen display of the display monitor 120 is returned to a live view screen including a through image or the like, for example.

Next, the camera controller 140, referring to the set lock pattern, sets the operational lock function to be active (S23). According to the activation of the operational lock function (S23), each of the operation members set to be a lock target in the lock pattern is collectively controlled to the lock state, resulting in disabling the user operation in the above operation member. Processing by the operational lock function activated in step S23 (i.e., operational lock processing) will be described below.

Thereafter, the camera controller 140 determines whether or not the lock lever 360 is changed to the OFF state based on the operation signal from the lock lever 360 (S24). When the lock lever 360 is in the ON state (NO in S24), the camera controller 140 repeats the determination in step S24 at a predetermined cycle, for example.

When the lock lever 360 is changed to the OFF state (YES in S24), the camera controller 140 returns the setting of the operational lock function to be inactive (S25). At this time, the lock state is released in the operation member set to the lock target in the lock pattern, resulting in enabling the user operation in the above operation member.

After inactivation of the operational lock function (S25), the camera controller 140 ends the processing shown in the present flow. Thereafter, the camera controller 140 executes the processing onward step S21 again after a predetermined cycle, for example.

According to the above processing, whether the operation members as the lock targets in the lock pattern is collectively set to the lock state or not can be controlled according to the user operation of switching the lock lever 360 to the OFF/ON state.

In step S22 described above, the display screen when the lock lever 360 is turned on is not particularly limited to the confirmation screen in FIG. 13. For example, a screen display may be performed to further include the lock target marker M1 of the target member of the lock target in the set lock pattern. In step S22, the same display as the pattern selection screen (FIG. 7B) may be performed. In this case, the lock pattern selection operation (FIG. 6) may be performed. In addition, the processing in step S22 may be omitted. The camera controller 140 may activate the lock operation function without displaying the screen in FIG. 13 and the like (S23).

2-3-2. Operational Lock Processing

The operational lock processing by the operational lock function activated in step S23 in FIG. 12 will be described with reference to FIGS. 14 and 15.

Figure 14:
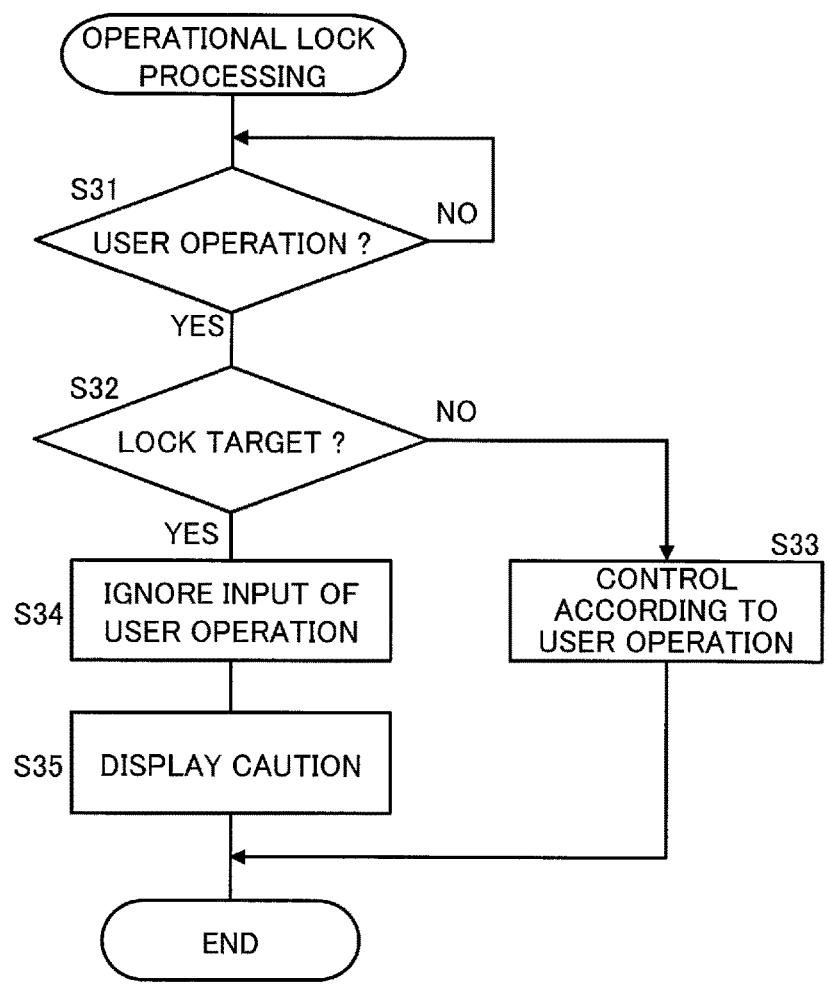
FIG. 14 is a flowchart for illustrating operational lock processing in the digital camera.

FIG. 14 is a flowchart for illustrating operational lock processing in the digital camera 1. FIG. 15 shows a display example in the operational lock processing. The processing shown in the present flow is repeatedly executed at a predetermined cycle when the lock lever 360 is in the ON state. Hereinafter, a processing example where the lock state is implemented by a software to disable the user operation will be described.

At first, the camera controller 140 detects an input of a user operation based on operation signals from the various operation units 130 and the external apparatus (S31). The camera controller 140 repeats the detection in step S11 at a predetermined cycle, for example.

When the user operation is input (YES in S31), the camera controller 140 determines whether or not the operation member transmitting the received operation signal is a lock target, based on the lock pattern, for example (S32). For example, in the case where the operated operation member is not a target member of the operational lock function, and in another case where the operated operation member is the target member but is an unlock target in the lock pattern, the camera controller 140 proceeds to NO in step S32.

When the operated operation member is not the lock target (NO in S32), the camera controller 140 executes control according to the instruction of the user operation indicated by the operation signal (S33). Thus, the user operation in the operation member being the unlock target in the lock pattern is enabled even when the lock lever 360 is in the ON state.

On the other hand, when the operated operation member is in the lock state (YES in S32), the camera controller 140 ignores the instruction of the user operation indicated by the operation signal (S34). Thus, it is possible to achieve the lock state in which the control according to the instruction of the input user operation is not executed for the operation member of the lock target, and to disable the user operation.

Furthermore, the camera controller 140 controls the display monitor 120 so that the display monitor 120 displays information for calling attention to the lock state (S35). A display example in step S35 is illustrated in FIG. 15.

Figure 15:
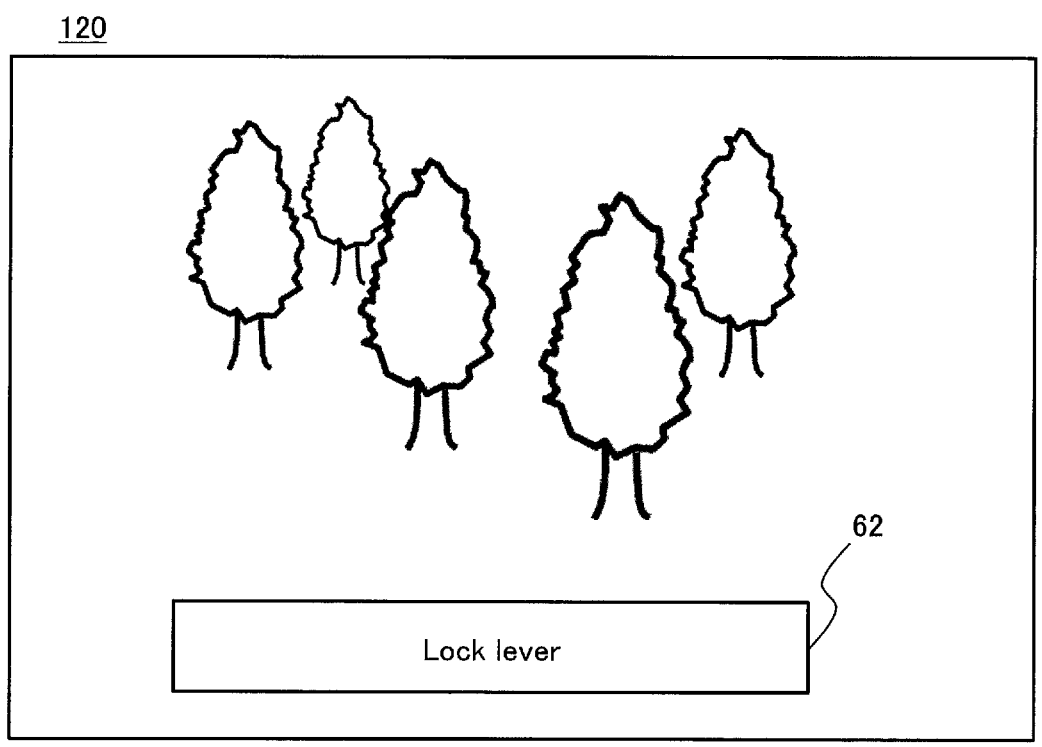
FIG. 15 is a diagram showing a display example in the operational lock processing.

In the display example in FIG. 15, the display monitor 120 displays a caution message 62 of "lock lever" under the control in step S35 on the live view screen displayed since before step S35, for example. With the caution message 62, the user can see that operating the lock lever 360 enables the input, in order to input a proper operation rather than an erroneous operation.

For example, the camera controller 140 causes the caution message 62 to be displayed during a predetermined duration (S35), and ends the processing shown in the present flow. Also when having executed the control according to the user operation (S33), the camera controller 140 ends the processing of the present flow. After completion of this processing, the camera controller 140 executes the processing in and after step S31 again, when the lock lever 360 is in the ON state after a predetermined cycle, for example.

According to the operational lock processing described above, the operation members of the lock targets are collectively controlled to the lock state based on the preset lock pattern, and the user operation can be disabled. Thus, it is possible to suppress an erroneous operation of the target member of the operational lock function.

3. Effects and the Like

As described above, each of the digital camera 1 and the camera body 100 being examples of the imaging apparatus of the present embodiment includes the image sensor 110 being an example of the image sensor, a plurality of operation members such as the operation unit 130, the selection key 310 and the like being an example of the selector, and the camera controller 140 being an example of the controller. The image sensor 110 captures a subject image to generate image data. Each of the plurality of operation members inputs a user operation. The selector selects one pattern from among a plurality of patterns (i.e., lock patterns) each indicating a combination as to whether or not each operation member is a target (i.e., a lock target) set to a lock state in which the user operation is disabled. Based on the pattern selected by the selector, the camera controller 140 controls a lock function (i.e., an operational lock function) causing the plurality of operation members to disable the user operation in an operation member that is in a lock state and to enable the user operation in an operation member that is not in a lock state.

According to the above imaging apparatus, the lock states in the various operation members are controlled according to the selected pattern, and it is possible to facilitate to suppress an erroneous operation in various situations in the operational lock function.

In the present embodiment, the imaging apparatus further includes a grip 101 provided with one or more of the plurality of operation members. The plurality of patterns include a pattern 1 (first pattern) in which the operation member provided on the grip is to be set to the lock state and a pattern 2 (second pattern) in which more operation members than those in the first pattern are to be set to the lock state. Thus, for example, proper use can be achieved such as locking the operation member disposed around the grip 101 using the pattern 1 at the time of capturing a still image, and locking further operation member using the pattern 2 at the time of capturing a moving image. Thus, it is possible to easily suppress an erroneous operation in various situations.

In the present embodiment, the imaging apparatus further includes a lock lever 360 as an example of a lock member that switches active or inactive of the operational lock function. When the lock function is switched to be active by the lock lever 360 (YES in S21), the camera controller 140 collectively sets the target operation members in the selected pattern to the lock state (S23). Thus, the lock state of the operation member set as the lock target in the lock pattern can be easily obtained.

In the present embodiment, the imaging apparatus further includes a flash memory 142 being an example of a memory for storing information. In response to a user operation instructing whether or not each individual operation member in the plurality of operation members is set to the lock state, the camera controller 140 records a pattern corresponding to the user operation in the memory (FIG. 8). Thus, the user can obtain a lock pattern in which a desired operation member is set to a lock/unlock target, and thereby can easily use the operational lock function.

In the present embodiment, the imaging apparatus further includes a display monitor 120 being an example of a display that displays information. The camera controller 140 controls the display monitor 120 to display the lock target markers M1 being examples of the plurality of position markers showing the identifications of respective positions where the plurality of operation members are arranged in the own device (S11), and based on the user operation of selecting a specific lock target marker M1 from the plurality of lock target markers M1, the camera controller 140 switches whether or not the operation member corresponding to the selected lock target marker M1 is a target to be set to the lock state (S12). With the lock target marker M1, the user can set the lock pattern while checking the position of the target member and the setting of the lock/unlock target, and can easily perform the setting for suppressing the erroneous operation by the operational lock function.

In the present embodiment, the imaging apparatus further includes a display monitor 120 that displays a setting screen. The selector such as the selection key 130 selects one pattern according to the user operation to be input in a state (FIG. 7A) where a setting screen including a plurality of options corresponding to a plurality of patterns is displayed on display monitor 120 (S1). A desired lock pattern can be selected from a plurality of lock patterns prepared in advance in the setting menu, and it is possible to easily suppress an erroneous operation in various presumed situations.

In the present embodiment, the camera body 100 being an example of the imaging apparatus can mount the interchangeable lens 100 being an example of an external apparatus including one or more operation members. The pattern of the operational lock function, that is, the lock pattern may indicate whether or not the operation members for each external apparatus are targets to be collectively set to the lock state (see FIG. 5). For example, various operation members of the interchangeable lens 200 may be collectively managed as lock/unlock targets.

In the present embodiment, the plurality of operation members include a plurality of moving image buttons 381 and 382 for instructing moving image shooting. The lock pattern indicates whether or not each of the moving image buttons 381 and 382 is a target to be individually set to the lock state. Thus, even among the moving image buttons 381 and 382, the moving image button desired to be locked and the moving image button not to be locked can be individually set according to the attachment position and the like, and the operational lock function can be easily used.

In the present embodiment, the plurality of operation members include a plurality of physically provided Fn buttons 341 to 343. The lock pattern indicates whether or not each of the Fn buttons 341 to 343 is a target to be individually set to the lock state. Thus, the plurality of Fn buttons 341 to 343 provided at various positions in the digital camera 1 can be individually set to the lock/unlock targets, and the operational lock function can be easily used.

In the present embodiment, the imaging apparatus further includes a display monitor 120 that displays a plurality of virtual Fn buttons 40. According to whether or not the operation member (e.g., the touch panel 300) for inputting the operation of the virtual Fn button in the plurality of operation members is in the lock state, the camera controller 140 collectively controls whether or not to accept the operation of the virtual Fn button 40. Thus, physically separate ones of the various Fn buttons 341 to 343 and 40 can be individually set to the lock/unlock targets, and it is possible to easily suppress an erroneous operation corresponding to the provided position.

In the present embodiment, the imaging apparatus includes an image sensor 110 that captures a subject image to generate image data, a plurality of operation members to each of which a user operation is input, a camera controller 140 that sets a lock state for disabling the user operation in the plurality of operation members, and a display monitor 120 that displays information. The camera controller 140 controls the display monitor 120 so that the display monitor 120 displays a plurality of lock target markers M1 indicating the identification displays of respective positions where the plurality of operation members are arranged in the own device (S11), and based on the user operation of selecting a specific lock target marker M1 from the plurality of lock target markers M1, the camera controller 140 switches whether or not the operation member corresponding to the selected lock target marker M1 is a target to be set to the lock state (S22). This also can facilitate to suppress erroneous operations in various situations in the imaging apparatus.

In the present embodiment, the imaging apparatus may further include a selector that selects one pattern from among a plurality of patterns each pattern indicating a combination of whether or not to be a target to be set to the lock state. Based on the pattern selected by the selector, in the plurality of operation members, the camera controller 140 may not accept the user operation in the operation member in the lock state and may accept the user operation in the operation member not in the lock state.

Other Embodiments

As described above, the first embodiment is described as an example of the technique disclosed in the present application. However, the technique in the present disclosure is not limited thereto, and can also be applied to embodiments in which changes, substitutions, additions, omissions, and the like are made as appropriate. In addition, it is also possible to combine each component described in the first embodiment to form a new embodiment. Thus, in the following, other embodiments will be exemplified.

In the first embodiment described above, an example of the lock pattern selection operation using the setting menu in the digital camera 1 has been described. The lock pattern may not be selected from a dedicated setting menu, and may be selected together with a change in an operation mode such as a custom mode. This modification will be described with reference to FIG. 16.

FIG. 16 is a diagram for illustrating a modification of the lock pattern selecting operation in the digital camera 1. In the present modification, the lock pattern is associated with a custom mode that can be changed to a setting desired by the user, for example. FIG. 16 illustrates custom mode information D2 including lock pattern information D1 of the present modification. The custom mode information D2 is setting information for collectively managing various settings such as a photo menu and a movie menu for each custom mode.

In the present modification, the lock pattern information D1 is incorporated into the custom mode information D2 as shown in FIG. 16, for example. In the custom mode information D2 in the example in FIG. 16, the lock pattern of the pattern 1 described above is incorporated into the mode 1 for still image shooting, and the lock pattern of the pattern 2 described above is incorporated into the mode 2 for moving image shooting (see FIG. 5).

In the lock pattern selection operation in the present modification, processing similar to that in FIG. 6 is started when the shooting mode dial 351 is operated. The shooting mode dial 351 is an example of the selector in the present modification.

For example, in response to the operation for switching between the operation modes with the shooting mode dial 351, the camera controller 140 selects the lock pattern corresponding to the switched operation mode in the custom mode information D2 (S1 in FIG. 6). In this case, when causing various settings corresponding to the switched operation mode in the custom mode information D2 to be reflected in the digital camera 1, the camera controller 140 sets the selected lock pattern as the setting of the lock lever 360 in the switched operation mode (S2).

According to the above lock pattern selection operation, simultaneously with the user's switching the operation mode of the digital camera 1 to a specific custom mode in order to perform desired shooting, the lock pattern corresponding to the custom mode becomes available. Therefore, a lock pattern according to the image-shooting situation can be obtained, and the operational lock function can be easily used.

As described above, in the digital camera 1 of the present embodiment, the selector such as the shooting mode dial 351 selects the lock pattern associated with the selected shooting mode according to the user operation of selecting one shooting mode from among a plurality of shooting modes associated with the plurality of respective lock patterns. This also makes it easy to suppress erroneous operations in various situations as in the first embodiment.

In the above embodiments, an example of the lock pattern editing operation has been described. The lock pattern editing operation may be performed in such a way as to edit a new lock pattern using the registered lock pattern. Such a modification will be described with reference to FIGS. 17A to 18.

Figure 18:
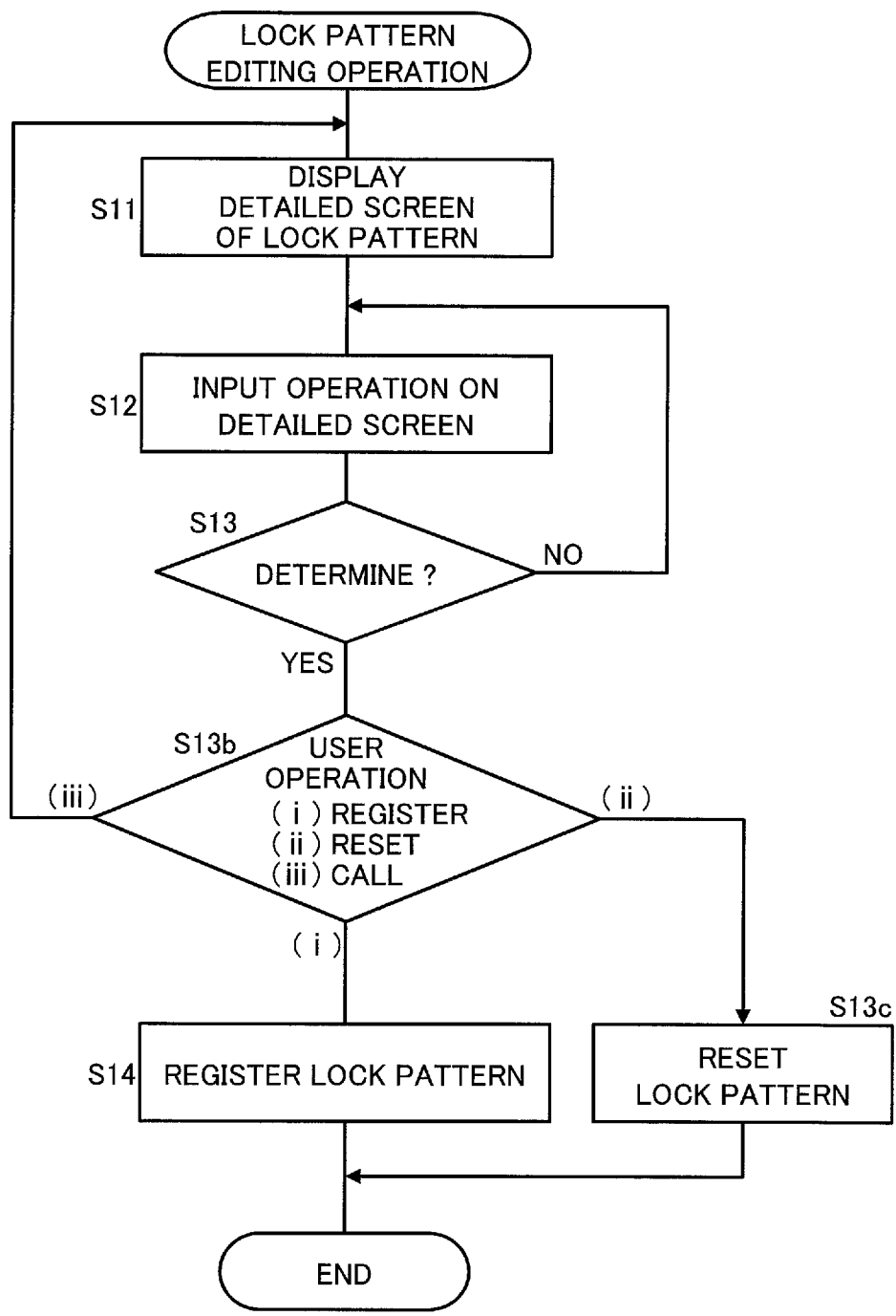
FIG. 18 is a flowchart showing the modification of the lock pattern editing operation.

FIGS. 17A to 17D are diagrams for illustrating a modification of the lock pattern editing operation. FIG. 18 is a flowchart showing the present modification. FIG. 17A shows an example in which "pattern 2" is selected as the source lock pattern that is to be edited on a pattern selection screen similar to that of the first embodiment.

For example, when the user operates the edit button 42 or the Q button 331 with the focus region R1 being arranged on the source lock pattern, the camera controller 140 calls the lock pattern from the flash memory 142 or the like, and causes the display monitor 120 to display the lock pattern (S11). FIG. 17B shows a display example of the detailed screen of the lock pattern in step S11.

The camera controller 140 receives an operation of editing the content called in the detailed screen of the lock pattern (S12). When the user inputs an operation of the Q button 331 or the registration/reset button 43a as in the first embodiment (YES in S13), the camera controller 140 receives a user operation of selecting the following options by screen display as shown in FIG. 17C, for example (S13b). The options in step 13b are any one of (i) registering the currently edited lock pattern, (ii) resetting the edited lock pattern, and (iii) calling the registered lock pattern.

FIG. 17D shows a display example on the display monitor 120 transitioning when the registration of the lock pattern is selected in FIG. 17C ((i) in S13b). In the present modification, when registering the lock pattern (S14), the camera controller 140 receives a user operation of selecting a registration destination of the lock pattern as shown in FIG. 17D, for example. In the examples in FIGS. 17A to 17D, "pattern 3" different from the source "pattern 2" is selected as the registration destination. Thus, according to digital camera 1 of the present modification, a new lock pattern based on the registered lock pattern can be registered separately from each other.

On the other hand, when (ii) reset is selected in step S13b, the camera controller 140 resets the source lock pattern to the initial value lock pattern (S13c), and ends the processing shown in the present flow, for example. When (iii) calling is selected in step S13b, the camera controller 140 receives a user operation of selecting a lock pattern of the target to be called as in FIG. 17A, for example, to perform the processing onward step S11 again based on the called lock pattern.

As described above, in the digital camera 1 of the present embodiment, the camera controller 140 responds to an edit operation and reset operation, the edit operation for editing another lock pattern from the lock pattern stored in the memory such as the flash memory 142 and the reset operation for resetting the lock pattern being edited to a predetermined pattern. Thus, various lock patterns can be easily set in the digital camera 1, and the operational lock function can be easily used.

In the above embodiments, the interchangeable lens 200 has been exemplified as an example of the external apparatus serving as the target member in the operational lock function. In the digital camera 1 of the present embodiment, the external apparatus serving as the target member of the operational lock function is not limited to the interchangeable lens 200, and may be various external accessories, for example. For example, a battery grip, an external flash device, an external finder, an XLR terminal microphone unit, and the like that can be attached to the digital camera 1 may be each managed as target members. Regarding the various external apparatuses as described above, the lock pattern in this case indicates whether or not the operation members included in the external apparatuses are the targets collectively set to the lock state for each type of the external apparatuses.

In the above embodiments, the lock target marker M1 is exemplified as an example of the position marker indicating the identification display of the target member of the operational lock function. In the present embodiment, the position marker is not limited to the above. For example, in the camera view M10 displayed on the display monitor 120 by the digital camera 1, the position marker may be configured by highlighting the target member of the operational lock function with a predetermined color. For example, in the camera view M10, the operation member of the lock target and the operation member of the unlock target may be highlighted in different colors, and the lock/unlock target may be toggled by a touch operation or the like at the place.

In the above embodiments, an example of implementing the lock state of the operation member by software has been described. In the present embodiment, the lock state is not limited to the above, and may be implemented, electrically or mechanically, for example. For example, the lock state may be implemented by turning off the energization to the operation member of the lock target.

In the above embodiments, an interchangeable lens type digital camera is described as an example of the imaging apparatus, but the imaging apparatus of the present embodiment may be not in particular an interchangeable lens type digital camera. In addition, the idea of the present disclosure may be applied not only to a digital camera but also to a movie camera, and can also be applied to an electronic apparatus having various imaging functions such as a mobile phone or a PC with a camera.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be certified that these non-essential components are essential immediately because these non-essential components are described in the accompanying drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to various imaging apparatuses having an operational lock function for disabling a user operation on an operation member.

The invention claimed is:

1. An imaging apparatus comprising:
   an image sensor configured to capture a subject image to generate image data;
   a plurality of operation members each operable via physical manipulation to input a user operation;
   a selector configured to select one pattern from among a plurality of patterns, each of the plurality of patterns indicating a different combination of operations members among the plurality of operations members which are to be in a lock state with respect to physical manipulation thereof, and operation members among the plurality of operation members which are not to be in a lock state with respect to physical manipulation thereof; and
   a controller configured to control operation of the imaging apparatus in response to user operations input via physical manipulation of the plurality of operation members, and configured to control a lock function of the plurality of operation members based on the pattern selected by the selector, the lock function causing:
      the operation members among the plurality of operation members which are to be in a lock state, according to the selected pattern, to be in a lock state whereby the controller is not responsive to a user operation resulting from physical manipulation of the corresponding operation member, and
      the operation members among the plurality of operations members which are not to be in a lock state, according to the selected pattern, not to be in a lock state whereby the controller is responsive to a user operation resulting from physical manipulation of the corresponding operation member.

2. The imaging apparatus according to claim 1, further comprising a grip provided with an operation member of the plurality of operation members,
   wherein the plurality of patterns include
   a first pattern in which the operation member provided on the grip is to be set to the lock state, and
   a second pattern in which more operation members than the operation member in the first pattern are to be set to the lock state.

3. The imaging apparatus according to claim 1,
   further comprising a lock member configured to switch whether the lock function is active or not,
   wherein the controller is configured to collectively set the operation members in accordance with the selected pattern, in response to switching the lock function to be active by the lock member.

4. The imaging apparatus according to claim 1,
   further comprising a memory configured to store information,
   wherein the controller is configured to: in response to a user instruction whether each operation member of the plurality of operation members is respectively to be set to the lock state or not, record a pattern corresponding to the user instruction in the memory.

5. The imaging apparatus according to claim 4, wherein the controller is operable to respond to an edit operation and a reset operation, the edit operation editing another pattern from a pattern stored in the memory, and the reset operation resetting an edited pattern to a predetermined pattern.

6. The imaging apparatus according to claim 1,
   further comprising a display configured to display information,
   wherein the controller is configured to control the display to display a plurality of position markers showing identifications of respective positions where the plurality of operation members are arranged in the imaging apparatus, and
   wherein, based on a user operation selecting a position marker from the plurality of position markers, the controller is configured to switch whether an operation member corresponding to the selected position marker is to be set to the lock state or not.

7. The imaging apparatus according to claim 1, wherein, according to a user operation selecting one shooting mode from among a plurality of shooting modes each associated with each of the plurality of patterns, the selector is configured to select a pattern associated with the selected shooting mode.

8. The imaging apparatus according to claim 1,
   further comprising a display configured to display a setting screen,
   wherein the selector is configured to select the one pattern according to a user operation that is input with a setting screen being displayed on the display, the setting screen including a plurality of options corresponding to the plurality of patterns.

9. The imaging apparatus according to claim 1,
   wherein the imaging apparatus is configured to mount one or more external apparatuses each including one or more operation members, and
   wherein the pattern for the lock function indicates for each external apparatus whether the operation members in the external apparatus are to be collectively set to the lock state or not.

10. The imaging apparatus according to claim 1,
wherein the plurality of operation members include a plurality of moving image buttons each for instructing shooting a moving image, and
wherein the pattern for the lock function indicates whether each moving image button is respectively to be set to the lock state or not.

11. The imaging apparatus according to claim 1,
wherein the plurality of operation members include a plurality of function buttons each being physically provided, and
wherein the pattern for the lock function indicates whether each function button is respectively to be set to the lock state or not.

12. The imaging apparatus according to claim 11,
further comprising a display configured to display a plurality of virtual function buttons,
wherein the controller is configured to collectively control whether to enable or disable an operation of the virtual function button according to whether a corresponding operation member among the plurality of operation members is in the lock state or not, the corresponding operation member being operable to input the operation of the virtual function buttons.

13. An imaging apparatus comprising:
an image sensor configured to capture a subject image to generate image data;
a plurality of operation members each operable to input a user operation;
a controller configured to set a lock state in the plurality of operation members, the lock state capable of being set for each operation member to disable the user operation; and
a display configured to display information,
wherein the controller is configured to control the display to display an image of the imaging apparatus and a plurality of position markers showing identifications of respective positions where the plurality of operation members are arranged in the imaging apparatus, and
wherein, based on a user operation selecting a position marker from the plurality of position markers, the controller is configured to switch whether an operation member corresponding to the selected position marker is to be set to the lock state or not.

14. The imaging apparatus according to claim 13,
further comprising a selector configured to select one lock pattern from among a plurality of lock patterns each indicating a combination whether each operation member is to be set to the lock state or not,
wherein the controller is configured to cause the display to display the lock pattern selected by the selector, and
wherein, based on a user operation using the lock pattern displayed on the display, the controller is configured to set a lock target or an unlock target for each of the operation members.

15. The imaging apparatus according to claim 14, wherein the selector is configured to select the one lock pattern according to a user operation that is input with a setting screen being displayed on the display, the setting screen including a plurality of options corresponding to the plurality of lock patterns.

16. The imaging apparatus according to claim 14, wherein, according to a user operation selecting one shooting mode from among a plurality of shooting modes each associated with each of the plurality of lock patterns, the selector is configured to select a lock pattern associated with the selected shooting mode.

17. The imaging apparatus according to claim 14,
further comprising a memory configured to store information,
wherein the controller is configured to: in response to a user instruction whether each operation member of the plurality of operation members is respectively to be set to the lock state or not, record in the memory an edited lock pattern according to the user instruction.

18. The imaging apparatus according to claim 17, wherein the controller is operable to respond to an edit operation and a reset operation, the edit operation editing another lock pattern from a lock pattern stored in the memory, and the reset operation resetting an edited lock pattern to a predetermined lock pattern.

19. The imaging apparatus according to claim 13, wherein the position marker includes: a lock icon indicating whether the operation member is set to either a lock target or an unlock target; and a lead line connecting the lock icon to a position of the operation member.

20. The imaging apparatus according to claim 19,
wherein the display is configured to display a focus region movable among a plurality of lock icons, and
wherein the lock icon on which the focus region is arranged is operable to receive a user operation switching the lock target or the unlock target.

* * * * *